United States Patent
Yamazaki

(10) Patent No.: US 6,959,059 B1
(45) Date of Patent: Oct. 25, 2005

(54) RADIO SIGNAL RECEIVING CIRCUIT DETECTING A SYNCHRONIZING PATTERN

(75) Inventor: Kiyohiko Yamazaki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 663 days.

(21) Appl. No.: 09/638,920

(22) Filed: Aug. 16, 2000

(30) Foreign Application Priority Data

Oct. 29, 1999 (JP) .................. 11-309026

(51) Int. Cl.[7] .............................................. H04L 7/00
(52) U.S. Cl. ..................................... 375/368; 375/224
(58) Field of Search ................. 375/368, 365, 375/362, 354, 334, 224, 225, 226, 316, 367; 370/503, 508, 509, 510, 511, 512, 513, 514, 370/507, 498, 464

(56) References Cited

U.S. PATENT DOCUMENTS

| | | | |
|---|---|---|---|
| 4,837,854 A * | 6/1989 | Oyagi et al. ............... 340/7.33 |
| 5,402,446 A * | 3/1995 | Minami ........................ 375/344 |
| 5,764,584 A * | 6/1998 | Fukiage et al. .......... 365/230.03 |
| 5,854,876 A * | 12/1998 | Kim ............................ 386/124 |
| 5,889,924 A * | 3/1999 | Okabayashi et al. ......... 700/245 |
| 6,178,215 B1 * | 1/2001 | Zhang et al. ................ 375/371 |
| 6,385,257 B1 * | 5/2002 | Tobita et al. ................ 375/334 |
| 6,556,250 B1 * | 4/2003 | Zeidler et al. ............... 348/512 |

* cited by examiner

*Primary Examiner*—Tesfaldet Bocure
*Assistant Examiner*—Pankaj Kumar
(74) *Attorney, Agent, or Firm*—Rabin & Berdo, P.C.

(57) ABSTRACT

A pulse generator is provided which operates as a counter capable of resetting a count according to an instruction signal for providing instructions for the detection of a synchronizing pattern from a previously received burst signal having some of continuous pseudo random patterns. The pulse generator performs counting up to timing provided to detect a synchronizing pattern of a burst signal having a continuous part of a pseudo random pattern to be consecutively received and thereby outputs a count-up signal CO similar to the instruction signal.

20 Claims, 2 Drawing Sheets

RADIO SIGNAL RECEIVING CIRCUIT DETECTING A SYNCHRONIZING PATTERN

BACKGROUND OF THE INVENTION

1. Field of the Invention

The present invention relates to a receiving circuit suitable for use in a radio apparatus using a TDMA (Time Division Multiple Access) or the like.

2. Description of the Related Art

In a digital mobile communication, a frame used as a fundamental cycle or period is determined and a radio signal is transmitted and received by using constant time widths (called principally "time slots") assigned within the frame.

Therefore, radio lines or circuits using the same frequency can be used on a time-sharing basis. Thus, respective stations, which perform communications, respectively have a common time base and allows a transmitted radio signal to have synchronizing patterns (also called "unique words") as information to be used in the respective stations as time bases, thereby making it possible to perform timing control so that they do not overlap each other over the radio lines.

Namely, a transmitting side (e.g., a base station) modulates digital data to be transmitted and transmits burst signals each represented in a predetermined format, which include the modulated data and synchronizing patterns, as a radio signal. A receiving side (e.g., a mobile station) demodulates the received radio signal and detects the corresponding synchronizing pattern from data (hereinafter called "demodulated data") demodulated therein. When the synchronizing pattern is detected, the data is stored based on clock signals for storing and outputting the demodulated data with the synchronizing pattern as the time base. Owing to the detection of the synchronizing pattern, it is possible to determine which position of the demodulated data corresponds to desired data.

The stored data is outputted to an external microcomputer and a superior circuit and subjected to desired processing according to purposes.

On the other hand, when no synchronizing pattern is detected, the previously-received and stored data or data in which all the bits are fixed to logical "0" or "1", is outputted to the external microcomputer and the superior circuit.

A bit error rate characteristic might be measured by a wireless or radio apparatus. The bit error rate characteristic is one obtained by receiving a ratio between a radio signal and noise as a parameter and measuring to which extent each demodulated data would err. Measuring the bit error rate characteristic makes it possible to determine the quality of digital transmission made between two stations for performing transmission and reception.

Upon the measurement of the bit error rate characteristic, the transmitting side, e.g., a test signal generator transmits modulated data comprised of a pseudo random pattern based on a predetermined law, which is called "pseudo random pattern", together with a synchronizing pattern as data modulated in each transmitted burst signal.

The receiving side, e.g., the mobile station receives and demodulates the transmitted burst signal. A receiving or receiver circuit on the receiving side detects a synchronizing pattern from demodulated data. When the synchronizing pattern is detected, data equivalent to a pseudo random pattern can be stored in the receiving circuit from the demodulated data. The stored data is outputted to, for example, a testing device or the like. The testing device confirms in bit units whether the stored data is based on a law used to generate the pseudo random pattern upon transmission. Of the received data, bits non-based on the law used to generate the pseudo random pattern upon transmission are counted as errors. A bit error rate characteristic is measured based on the counted number.

Here, the transmitting side divides the continuous pseudo random pattern over continuous plural frames by predetermined burst signals for the respective frames and transmits the divided ones therefrom. Therefore, when the receiving circuit is not able to detect the corresponding synchronizing pattern from demodulated data of each transmitted burst signal, it cannot extract data corresponding to a pseudo random pattern from the demodulated data in the burst signal. Therefore, each burst signal from which no synchronizing pattern could not be detected, could lead to an about 50% probability of error. As a result, a correct bit error rate characteristic cannot be measured.

An object of the present invention is to provide a receiving circuit capable of solving the foregoing problems and more accurately measuring a bit error rate characteristic.

Another object of the present invention is to provide a receiving circuit which reduces the influence exerted on a normal operation thereof, an increase in the number of components constituting the receiving circuit, and an increase in power consumption as small as possible to thereby realize the above object.

SUMMARY OF THE INVENTION

According to one aspect of the present invention, for solving the above problems, there is provided a receiving circuit according to the present invention, for demodulating a received signal and detecting a synchronizing pattern from demodulated data in the demodulated received signal to thereby control the storage and output of desired data included in the demodulated data in response to the detected synchronizing pattern, comprising a demodulator circuit which demodulates the received signal and outputs the demodulated data therefrom; a detector which detects a synchronizing pattern included in the demodulated data and outputs an instruction signal for providing instructions for the result of detection; a pulse generator capable of receiving the instruction signal and outputting a pulse signal each time a predetermined time elapses since the reception of the instruction signal; a control circuit which outputs a control signal corresponding to at least either one of the instruction signal and the pulse signal; and a clock generator which generates clock signals for storing and outputting desired data included in the demodulated data in response to the control signal.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DESCRIPTION OF THE PREFFERED EMBODIMENTS

Figure 1:
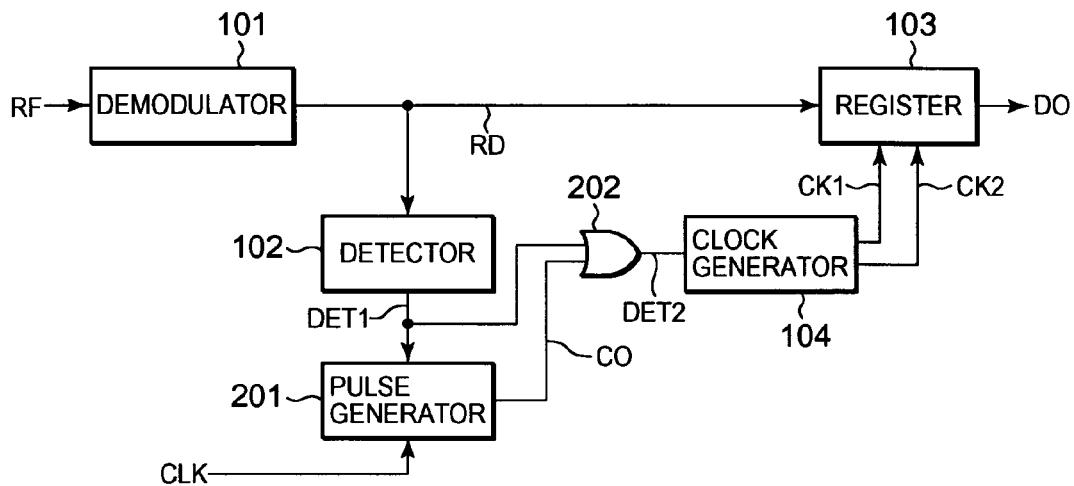
FIG. 1 is a circuit diagram showing a receiving circuit according to a first embodiment of the present invention.

Receiving circuits of the present invention will hereinafter be described in detail with reference to the accompanying drawings. FIG. 1 is a circuit diagram showing a receiving circuit according to a first embodiment of the present invention. Incidentally, the present invention will be described assuming that a receiving circuit is built in a radio or wireless apparatus on the mobile station side. However, the present invention is not limited to it and applicable even to one incorporated in an apparatus on the base station side.

In FIG. 1, the receiving circuit comprises a demodulator circuit 101, a detector 102, a register 103 used as storing means, a clock generator 104, a pulse generator 201, and a control circuit 202.

Burst signals for respective frames are inputted to the demodulator circuit 101 as a radio signal RF. The demodulator circuit 101 demodulates each received burst signal and outputs demodulated data RD therefrom.

The demodulated data RD is inputted to the detector 102. The detector 102 detects a synchronizing pattern from the received demodulated data RD. When the detector 102 detects a desired synchronizing pattern, it outputs a one-shot pulse for temporarily bringing a voltage level thereof to a source voltage level (for bringing a logical level to an H level, which is hereinafter called simply "H level") only during a short time as an instruction signal DET1. When the detector 102 is not capable of detecting the desired synchronizing pattern, the voltage level of the instruction signal DET1 remains maintained at a ground voltage level (i.e., the logical level is maintained at an L level, which is hereinafter called simply "L level").

The instruction signal DET1 and an operating clock signal CLK used for the operation of the receiving circuit, such as operations of the demodulator circuit 101 and the detector 102 are inputted to the pulse generator 201. The pulse generator 201 comprises a counter, for example. Namely, the pulse generator 201 counts the number of clocks of the operating clock signal CLK from an initial value (e.g., the count of 0). When the count or counted value reaches the limit of counting of the pulse generator 201 used as the counter, thereby resulting in an overflow, the pulse generator 201 generates a one-shot pulse as a count-up signal CO. The count-up signal CO is maintained at an L level in a state in which no one-shot pulse is generated from the pulse generator 201. After the overflow, the pulse generator 201 starts counting from the initial value again. Namely, the pulse generator 201 is a timer circuit for cyclically counting a predetermined counted value. When the pulse generator 201 is supplied with the one-shot pulse as the instruction signal DET1, i.e. the detector 102 detects the synchronizing pattern, the count of the pulse generator 201 is reset to the initial value. Incidentally, the limit of counting of the pulse generator 201 will be described later.

The pulse generator 201 can be implemented by a counter which comprises a plurality of flip-flops, for example. In this case, the pulse generator 201 may be configured in such a manner that the instruction signal DET1 is inputted to reset terminals of the plurality of flip-flops.

The control circuit 202 comprises a two-input one-output OR gate. The instruction signal DET1 and the count-up signal CO are inputted to their corresponding inputs of the OR gate. Therefore, when the instruction signal DET1 and count-up signal CO are both L in voltage level, the control circuit 202 outputs a control signal DET2 whose voltage level is an L level. Further, when either one of the instruction signal DET1 and count-up signal CO serves so as to produce a one-shot pulse, the control circuit 202 outputs a control signal DET2 in response to the one-shot pulse.

The control signal DET2 is inputted to the clock generator 104. When the clock generator 104 receives a one-shot pulse therein as the control signal DET2, it generates a first clock signal CK1 having a predetermined cycle and a second clock signal CK2 generated after the completion of generation of the first clock signal CK1.

The first clock signal CK1 is used to successively store desired data (corresponding to data processed by a microcomputer and an external device located at a stage subsequent to the receiving circuit) included in demodulated data. Therefore, the generation of the first clock signal CK1 is started with timing provided to cause data corresponding to desired data included in demodulated data to reach the register 103 to be described later. Clocks of the first clock signal CK1 are generated by the number of bits of the data referred to above. The second clock signal CK2 is used to successively output stored data. Therefore, the second clock signal CK2 has clocks generated by the number of bits of the data referred to above in a manner similar to the first clock signal CK1.

Namely, the clock generator 104 also acts as a timing control circuit for generating a first clock signal CK1 and a second clock signal CK2 for controlling timing provided to store and output desired data included in demodulated data.

The register 103 comprises, for example, a shift register which performs the storage of desired data to be stored by the number of bits of the data. The register 103 successively stores desired data included in received demodulated data in response to the first clock signal CK1 and successively outputs the stored data as output data DO in response to the second clock signal CK2. Namely, the first clock signal CK1 is used as a shift clock for the storage of data in the register 103, whereas the second clock signal CK2 is used as a shift clock for outputting the data stored in the register 103.

When burst signals are received and a desired synchronizing pattern is detected by the receiving circuit of FIG. 1 configured in this way, the receiving circuit operates so as to store and output desired data from demodulated data in the burst signals.

Figure 2:
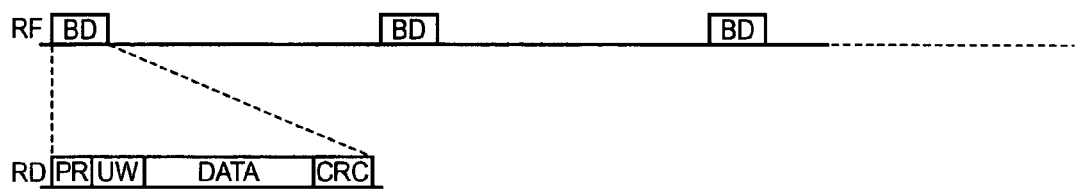
FIG. 2 is a timing chart for describing the operation of the receiving circuit according to the first embodiment of the present invention.

The transmitted burst signals and their formats will now be described with reference to the drawings. FIG. 2 is a diagram for describing transmitted burst signals and formats thereof.

A radio signal RF is one for transmitting signals in a burst (intermittent) state. Of the radio signal RF, a plurality of burst data having synchronizing patterns are placed in their corresponding frames. Now consider that the burst signals BD shown in FIG. 2 have synchronizing patterns respectively and have data to be captured by the radio apparatus which incorporates therein the receiving circuit according to the present invention.

The burst signal BD is configured in a predetermined format. As shown in FIG. 2, each of the burst signals BD has a preamble PR, a unique word UW corresponding to a synchronizing pattern, data DATA to be processed by a microcomputer or the like, and an error detection bit CRC (while it actually has a lamp time, a start symbol, etc., they are not illustrated in the interests of simplicity of their description because they are unnecessary in view of the description of the present invention). The numbers of bits are respectively fixed to the preamble PR, the unique word UW, the data DATA and the error detection bit CRC in advance. Therefore, if the synchronizing pattern based on the unique word UW can be detected from the demodulated data, then the position of the data DATA can also be confirmed. Incidentally, the above description has been made assuming that each demodulated data DATA is stored in the register 103.

Further, the interval between the adjacent frames has been determined in advance. Therefore, if a synchronizing pattern can be detected from a previously-received burst signal BD, then the position of a synchronizing pattern of a burst signal to be next received and the position of data DATA thereof can be confirmed. The interval between the position of the synchronizing pattern detected from the firstly-received burst signal BD and the position of the data DATA of the burst signal BD to be next received corresponds to an interval of about 5 ms. Therefore, the limit of counting of the pulse generator 201 may be set so as to be equivalent to a number obtained by dividing the interval (about 5 ms) by a time corresponding to one cycle of the operating clock signal CLK1 to be counted.

Here, a pseudo random pattern used to measure a bit error rate characteristic is placed in each data DATA shown in FIG. 2. Continuous pseudo random patterns are divided among the respective burst signals BD shown in FIG. 2 and successively transmitted.

Thus, the reliable storage of the divided and transmitted continuous pseudo random patterns in the register 103 as data is required to more accurately measure the bit error rate characteristic.

Figure 3:
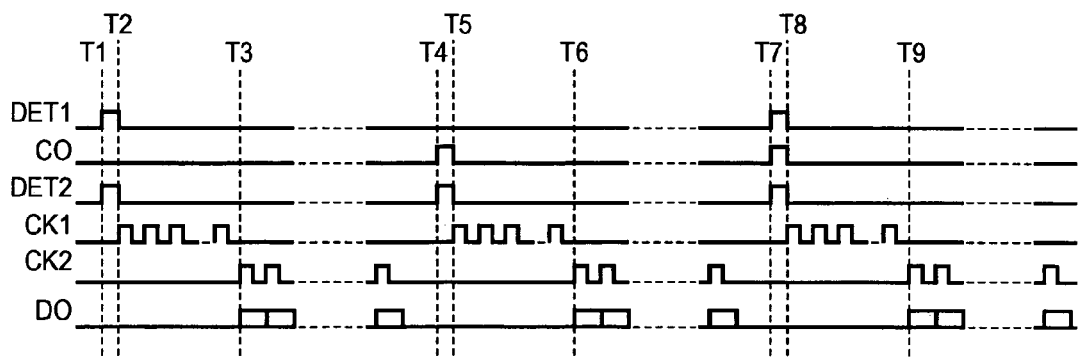
FIG. 3 is a diagram for describing transmitted burst signals and the formats of the burst signals.

The operation of the receiving circuit shown in FIG. 1 at the measurement of the bit error rate characteristic will next be described below. FIG. 3 is a timing chart for describing the operation of the receiving circuit according to the first embodiment of the present invention. Symbols in FIG. 3 at which respective signals are designated, correspond to the symbols given to the signals in FIG. 1.

When the receiving circuit is in an initial state, i.e., in a state in which burst signals each having a desired pseudo random pattern have not been received as a radio signal RF, a voltage level of an instruction signal DET1 is brought to an L level. Now consider where while the pulse generator 201 is performing counting, a voltage level of a count-up signal CO also remains at an L level. Therefore, a voltage level of a control signal DET2 also remains at the L level, and hence both first and second clock signals CK1 and CK2 are not generated.

Now consider where at a time T1, the receiving circuit obtains a desired synchronizing pattern from the burst signals received as the radio signal RF. Therefore, the instruction signal DET1 serves so as to generate a one-shot pulse whose voltage level reaches an H level up to a time T2. With its generation; the control signal DET2 is also rendered H in voltage level during a period of from the times T1 to T2. Based on a change in the control signal DET2, the clock generator 104 generates the first clock signal CK1 by the number of bits of data (pseudo random pattern) to be stored in the register 103, of demodulated data in the received burst signals. In FIG. 3, the clock generator 104 generates the first clock signal CK1 up to a time T3. Namely, the data to be stored is stored in the register 103 up to the time T3.

Based on a change in the instruction signal DET1 generated at the time T1, the count of the pulse generator 201 is temporarily reset to its initial value. The pulse generator 201 starts counting from the initial value again from the time T2.

At the time T3, the clock generator 104 generates the second clock signal CK2 subsequent to the first clock signal CK1. The second clock signal CK2 is generated by the number of bits of the data stored in the register 103. In FIG. 3, the second clock signal CK2 is being generated up to the time preceding a time T4. Namely, the respective stored data are successively outputted as output data DO from the register 103 up to the time T4.

Consider where a burst signal to be next received is received before the time T4. However, let's assume that no synchronizing pattern is detected from the demodulated data in the burst signal received herein. As a result, the voltage level of the instruction signal DET1, which is to generate a one-shot pulse at the time T4, remains at an L level.

At the time T4, the count of the pulse generator 201 reaches the limit of counting of the pulse generator 201 used as the counter, where a one-shot pulse is generated as a count-up signal CO. Namely, the limit of counting of the pulse generator 201 results in a count or counted value equivalent to a time (about 5 ms) from the time T2 to the time T4. By doing so, the pulse generator 201 is capable of estimating or predicting the position of a pseudo random pattern included in demodulated data of a burst signal to be next received since the detection of synchronization of the previously-detected burst signal and changing the control signal DET2 with timing provided to allow the pseudo random pattern to be stored in the register 103. Thus, at the time T4, the count-up signal CO serves so as to produce a one-shot pulse whose voltage level is brought to an H level up to a time T5. With its generation, the control signal DET2 is also rendered H in voltage level during a period of from the time T4 to the time T5.

Thus, even if no synchronizing pattern is detected from the demodulated data in each received burst signal, the pulse generator 201 is capable of generating a one-shot pulse with respect to the control signal DET2. As a result, the first and second clock signals CK1 and CK2 can be generated from the clock generator 104. Further, the pseudo random pattern can be stored in the register 103 even from the demodulated data in the burst signal from which no synchronizing pattern is detected.

The operation of the receiving circuit at the time T5 is performed in a manner similar to that at the time T2. Namely, a pseudo random pattern is stored in the register 103 according to the first clock signal CK1. On the other hand, the operation of the receiving circuit at a time T6 is performed in a manner similar to that at the time T3. Namely, the pseudo random pattern stored in the register 103 can be outputted as output data DO in response to the second clock signal CK2.

Incidentally, the pulse generator 201, which has generated the one-shot pulse as the count-up signal CO at the time T4, returns to its initial value and continues counting again from the time T5.

Now consider where a burst signal to be next received is received before a time T7. Let's now assume that a synchronizing pattern is detected from demodulated data in the received burst signal. As a result, at the time T7, the voltage level of the instruction signal DET1 serves so as to generate a one-shot pulse whose voltage level is kept at an H level up to a time T8.

At the time T7, the count of the pulse generator 201 reaches the limit of counting thereof again. Thus, the pulse generator 201 generates a one-shot pulse as a count-up signal CO.

Therefore, the instruction signal DET1 and the count-up signal CO both serve so as to generate one-shot pulses during a period of the times T7 to T8. Based on the one-shot pulses, the control signal DET2 also serves so as to produce a one-shot pulse.

Incidentally, the instruction signal DET1 and the count-up signal CO are considered to differ from each other in timing provided to bring their voltage levels to H levels respectively. However, if the synchronizing patterns are accurately detected, then a shift in timing is slight. There is thus no problem in storing data in the register 103.

The operation of the receiving circuit at the time T8 is performed in a manner similar to that at the time T2. Namely, a pseudo random pattern is stored in the register 103 according to the first clock signal CK1. On the other hand, the operation of the receiving circuit at a time T9 is performed in a manner similar to that at the time T3. Namely, the pseudo random pattern stored in the register 103 can be outputted as output data DO in response to the second clock signal CK2.

In the receiving circuit shown in FIG. 1 according to the present invention as described above, even when the synchronizing patterns are not detected from the demodulated data in the transmitted burst signals, the continuous pseudo random patterns transmitted in divided form can reliably be stored in the register 103 as the continuous data. It is therefore possible to more accurately measure the bit error rate characteristic.

Since the pulse generator 201 performs counting even upon the normal operation in the receiving circuit shown in FIG. 1, there is a possibility that when the operation of the receiving circuit is kept in an initial state, the one-shot pulse will be produced as the count-up signal CO with timing in which the instruction signal DET1 should not produce the one-shot pulse. In this case, the data stored in the register 103 is judged as an error, based on the error detection bit CRC included in the data. Thus, no problem occurs because the data can be abandoned. If the synchronizing pattern is thereafter detected from the demodulated data in each received burst signal, then the operation of the receiving circuit, which is similar to that shown in FIG. 3 can be achieved subsequently. Therefore, the normal operation can sufficiently be achieved even when the receiving circuit shown in FIG. 1 is applied as the present invention.

In the receiving circuit shown in FIG. 1, the number of the elements of structure or components used therefor does not increase so much.

Figure 4:
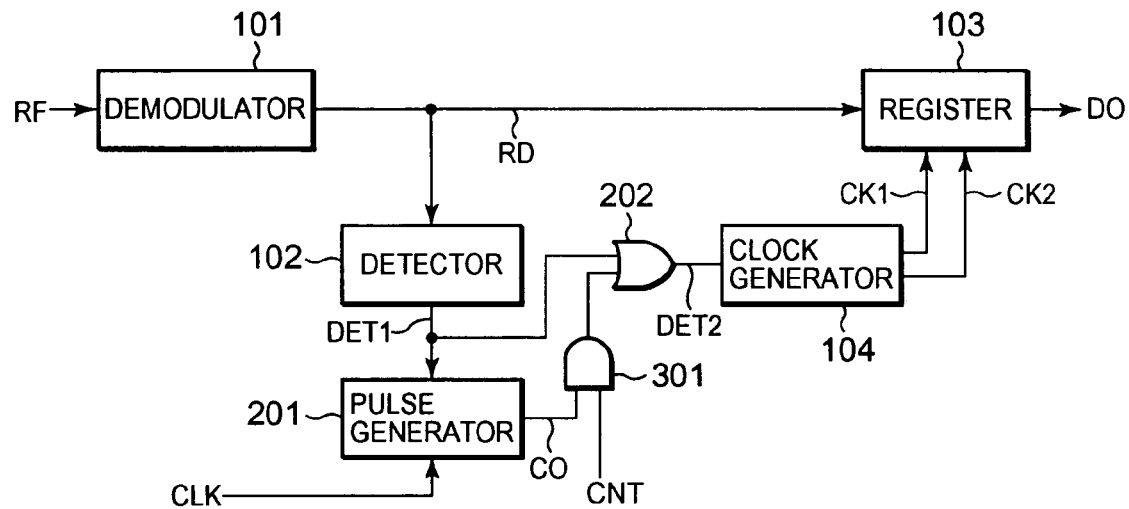
FIG. 4 is a circuit diagram illustrating a receiving circuit according to a second embodiment of the present invention.

A receiving circuit according to a second embodiment of the present invention will next be described in detail with reference to the drawings. FIG. 4 is a circuit diagram of the receiving circuit according to the second embodiment of the present invention. In FIG. 4, the same elements of structure as those shown in FIG. 1 are identified by the same reference numerals and the description of certain common elements will therefore be omitted.

In FIG. 4, there is provided a pulse transfer control circuit 301. The pulse transfer control circuit 301 shown in FIG. 4 comprises a two-input one-output AND gate. A count-up signal Co and a mode signal CNT are inputted to the pulse transfer control circuit 301. A signal outputted from the pulse transfer control circuit 301 is inputted as an alternative of the count-up signal CO which was one input signal for the control circuit 202 shown in FIG. 1.

Now, the mode signal CNT acts as a control signal for selectively setting the receiving circuit to a normally-operated state and a state for measuring a bit error rate characteristic. In FIG. 4, the normally-operated state is given or specified when the mode signal CNT is L in voltage level, whereas the state for measuring the bit error rate characteristic is given when the mode signal CNT is H in voltage level. Other elements of structure in FIG. 4 are similar to those shown in FIG. 1.

Owing to such a configuration as described above, the receiving circuit shown in FIG. 4 is operated and controlled as follows: When the voltage level of the mode signal CNT is of an H level, a signal having a voltage level corresponding to the voltage level of the count-up signal is outputted from the pulse transfer control circuit 301. Since the respective elements of structure have similar relations with those employed in the receiving circuit shown in FIG. 1 in this case, the operation of the receiving circuit, which is similar to FIG. 1, can be achieved.

When the voltage level of the mode signal CNT is of an L level, a signal whose voltage level is fixed to an L level, is outputted from the pulse transfer control circuit 301 regardless of the voltage level of the count-up signal. Namely, the influence of the count-up signal CO corresponding to the output signal of the pulse generator 201 is not exerted on a control circuit 202 and a clock generator 104 when the receiving circuit is in the normal operation.

Thus, when the receiving circuit shown in FIG. 4 is in the normal operation, no clock signals are generated from the clock generator 104 based on a change in the count-up signal CO. Thus, when the receiving circuit is in the normal operation, a one-shot pulse is generated as a count-up signal CO with timing in which an instruction signal DET1 should not generate a one-shot pulse when the operation of the receiving circuit is in an initial state, thereby making it possible to prevent data which is not to be stored in a register 103 from being stored therein. As a result, the register 103 can obtain data to be stored therein with more reliability and at high speed.

Upon the normal operation, a shift between timing provided for a change in the instruction signal DET1 and timing provided for a change in the count-up signal CO, both based on the detection of a synchronizing pattern no interferes with the proper storage of data to be stored.

Since the second embodiment can obtain the above-described effect owing to the addition of the pulse transfer control circuit 301 to the receiving circuit shown in FIG. 1, it is unnecessary to complicate a circuit configuration of the entire receiving circuit and change the circuits for the respective elements of structure or components which constitute the receiving circuit. Thus, an increase in the complexity of a manufacturing process and a great increase in the number of the components constituting the receiving circuit can be reduced to the utmost.

Figure 5:
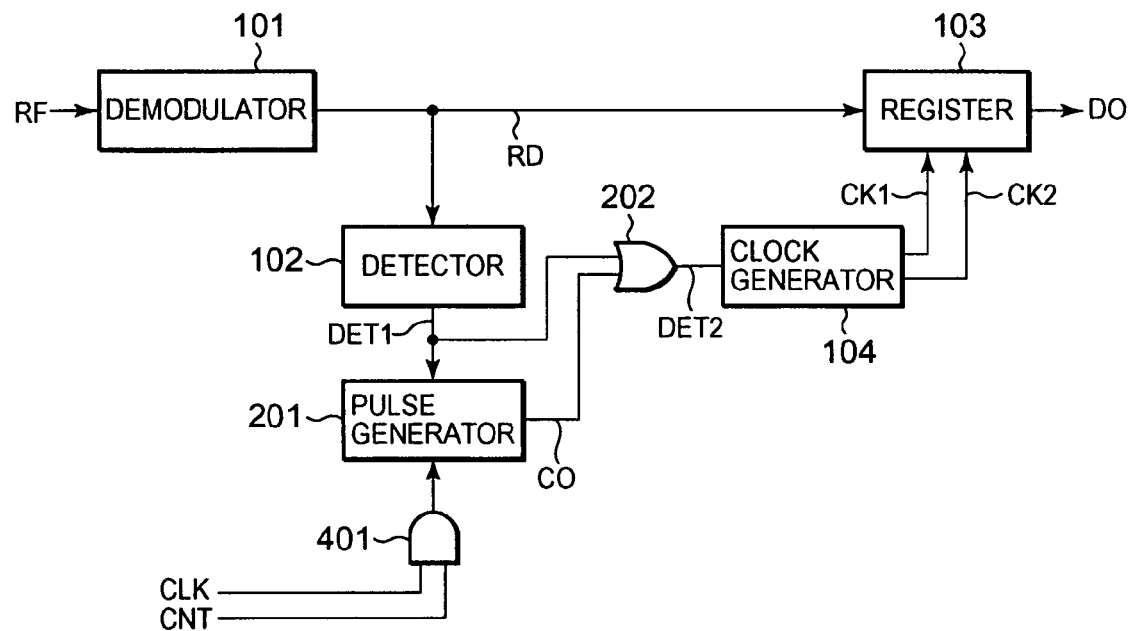
FIG. 5 is a circuit diagram showing a receiving circuit according to a third embodiment of the present invention.

A receiving circuit according to a third embodiment of the present invention will next be described in detail with reference to the drawings. FIG. 5 is a circuit diagram showing the receiving circuit according to the third embodiment of the present invention. In FIG. 5, the same elements of structure as those shown in FIG. 1 or 4 are identified by like reference numerals and the description of certain common elements will therefore be omitted.

While a circuit configuration shown in FIG. 5 is substantially similar to that shown in FIG. 1, there is further provided a clock transfer control circuit 401 in FIG. 5. The clock transfer control circuit 401 shown in FIG. 5 comprises a two-input one-output AND gate. The clock transfer control circuit 401 is supplied with an operating clock signal CLK and a mode signal CNT similar to that shown in FIG. 4. A signal outputted from the clock transfer control circuit 401 is inputted to a pulse generator 201. Namely, the pulse generator 201 regards the output signal of the clock transfer control circuit 401 as an object to be counted in FIG. 5. Other elements of structure in FIG. 5 are similar to those shown in FIG. 1.

Owing to such a configuration as described above, the receiving circuit shown in FIG. 5 is operated and controlled as follows: When the voltage level of the mode signal CNT is of an H level, a signal having a voltage level corresponding to the voltage level of the operating clock signal CLK is outputted from the clock transfer control circuit 401. Since the respective elements of structure have similar relations with those employed in the receiving circuit shown in FIG. 1 in this case, the operation of the receiving circuit, which is similar to FIG. 1, can be achieved.

When the voltage level of the mode signal CNT is of an L level, a signal whose voltage level is fixed to an L level, is outputted from the clock transfer control circuit 401 regardless of the voltage level of the operating clock signal CLK. Namely, when the receiving circuit is in a normal operation, the operating clock signal CLK is not supplied to the pulse generator 201 to stop the counting of the pulse generator 201 at the normal operation. Therefore, the pulse generator 201 can maintain a voltage level of a count-up signal CO indicative of an output signal at an L level upon the normal operation. Thus, the influence of the count-up signal CO at the normal operation is not exerted on a control circuit 202 and a clock generator 104 in a manner similar to the second embodiment.

Thus, while the receiving circuit shown in FIG. 5 is different in method from that shown in FIG. 4, the generation of clock signals from the clock generator 104 is avoided based on a change in the count-up signal CO upon the normal operation in a manner similar to the receiving circuit shown in FIG. 4. Thus, when the receiving circuit is in the normal operation, a one-shot pulse is generated as the count-up signal CO with timing in which an instruction signal DET1 should not generate a one-shot pulse when the operation of the receiving circuit is in an initial state, thereby making it possible to prevent data which is not to be stored in a register 103 from being stored therein. As a result, the register 103 can obtain data to be stored therein with more reliability and at high speed.

Since even the counting of the pulse generator 201 is stopped in FIG. 5, this can contribute to a reduction in power used up or consumed by the pulse generator 201 and a reduction in the entire power consumed by a radio apparatus which incorporates therein the receiving circuit according to the present invention.

Upon the normal operation even in the case of the receiving circuit shown in FIG. 5, a shift between timing provided for a change in the instruction signal DET1 and timing provided for a change in the count-up signal CO, both based on the detection of a synchronizing pattern no interferes with the proper storage of data to be stored.

Since the third embodiment can also obtain the above-described effect owing to the addition of the clock transfer control circuit 401 to the receiving circuit shown in FIG. 1, it is not necessary to complicate a circuit configuration of the entire receiving circuit and change the circuits for the respective elements of structure or components which constitute the receiving circuit. Thus, an increase in the complexity of a manufacturing process and a substantial increase in the number of the components constituting the receiving circuit can be reduced to the utmost.

While the receiving circuit according to the present invention has been described above in detail, the configuration of the receiving circuit according to the present invention is not limited to that employed in each embodiment referred to above.

While, for example, the count of the pulse generator 201 is reset by the instruction signal DET1, it is not limited to this. For example, an initial value storing register is provided so as to be capable of starting counting from an arbitrary initial value. Further, the set value stored in the present register is stored in the pulse generator 201 according to the instruction signal DET1, after which it may perform counting with the set value as the initial value.

While the register 103 outputs the stored data according to the second clock signal CK2, it may output the data according to the first clock signal CLK1.

If the control circuit 202, pulse transfer control circuit 301 and clock transfer control circuit 401 are respectively capable of performing the operations referred to above, then they may be constituted as other logic gates or circuit configurations.

If a timer for cyclically counting a predetermined count or counted value is used as the pulse generator 201, it is applicable even in the case of another configuration. Although the pulse generator 201 is changed in circuit configuration, the supply of operating power to the pulse generator 201 is controlled and the activation of the pulse generator 201 is controlled according to a mode signal, whereby power consumption may be reduced. In this case, an element, which deactivates the pulse generator 201 when the voltage level of the mode signal CNT is of an H level and which is fixed to a voltage level of a count-up signal CO corresponding to the output of the pulse generator 201 at this time, may preferably be provided to stabilize the voltage level of the count-up signal CO corresponding to the output of the pulse generator 201. As such an element may be considered, for example, an N channel type MOS transistor whose gate electrode is supplied with a mode signal CNT and which is connected between a signal line for transmitting a count-up signal CO and a ground voltage source if consideration is given to a possible reduction in the increase in the number of elements.

Further, the data stored in the register 103 is not limited to the data DATA of each demodulated data either. If data to be stored exists in addition to the data DATA, then the register 103 is set as the storable number of bits according to the number of bits of the data. Further, the numbers of clocks of the first and second clock signals CK1 and CK2 generated from the clock generator 104 are generated by the required number, after which they may be stored in the register 103.

According to the receiving circuit of the present invention as described above, a receiving circuit can be offered or provided which is capable of more accurately measuring a bit error rate characteristic.

According to the receiving circuit of the present invention as well, a receiving circuit can be provided which reduces the influence exerted on the normal operation thereof, an increase in the number of components constituting the receiving circuit, and an increase in power consumption as small as possible to achieve the effect referred to above.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A receiving circuit for measuring a bit error rate characteristic, comprising:
   a demodulator circuit demodulating a radio signal in a digital communication system that includes a burst signal and outputting the demodulated data therefrom;
   a detector which detects a synchronizing pattern included in the demodulated data and outputs an instruction signal for providing instructions for a result of the detection;
   a pulse generator capable of receiving the instruction signal and outputting a pulse signal each time a predetermined time elapses since the reception of the instruction signal;
   a control circuit which outputs control signals corresponding to at least either one of the instruction signal and the pulse signal; and
   a clock generator which generates a clock signal for storing and outputting a pseudo random pattern included in the demodulated data in response to the control signal.

2. The receiving circuit as claimed in claim 1, further including a pulse transfer control circuit which receives the pulse signal therein and controls the transfer of a signal corresponding to the pulse signal to said control circuit according to a mode signal.

3. The receiving circuit as claimed in claim 1, wherein said pulse generator comprises a counter which performs counting based on an operating clock signal used to operate said receiving circuit, and further including a clock transfer control circuit which receives the operating clock signal therein and controls the transfer of a signal corresponding to the operating clock signal to said pulse generator according to a mode signal.

4. The receiving circuit as claimed in claim 2, wherein said mode signal specifies a normal operating mode at a first voltage level and specifies a bit error rate measuring mode at a second voltage level different from the first voltage level, and said pulse transfer control circuit restrains the transfer of a signal corresponding to the pulse signal to said control circuit when the mode signal is of the first voltage level and permits the transfer of the signal corresponding to the pulse signal to said control circuit when the mode signal is of the second voltage level.

5. The receiving circuit as claimed in claim 3, wherein said mode signal specifies a normal operating mode at a first voltage level and specifies a bit error rate measuring mode at a second voltage level different from the first voltage level, and said clock transfer control circuit restrains the transfer of a transferring signal corresponding to the operating clock signal to said pulse generator when the mode signal is of the first voltage level and permits the transfer of the transferring signal corresponding to the operating clock signal to said pulse generator when the mode signal is of the second voltage level.

6. A radio signal receiving circuit for measuring a bit error rate characteristic, comprising:
   a demodulator circuit demodulating a burst signal in a digital communication system that is included in a radio signal received by the demodulator circuit, the demodulator circuit outputting demodulated data;
   a detector detecting a synchronizing pattern signal from the demodulated data received thereto;
   a pulse generator generating a pulse signal in response to the synchronizing pattern signal;
   a control circuit generating a control signal in response to the synchronizing pattern signal and the pulse signal;
   a clock generator outputting a clock signal in response to the control signal; and
   a storing circuit storing and outputting a pseudo random pattern included in the demodulated data in response to the clock signal.

7. A radio signal receiving circuit according to claim 6, wherein the burst signal includes a preamble, a unique word, an error detection bit and data.

8. A radio signal receiving circuit according to claim 7, wherein the unique word corresponds to the synchronizing pattern signal.

9. A radio signal receiving circuit according to claim 6, wherein the pulse generator includes a counter.

10. A radio signal receiving circuit according to claim 6, wherein the pulse generator generates the pulse signal when either one of the synchronizing pattern signal or the pulse signal is activated.

11. A radio signal receiving circuit according to claim 6, wherein the clock signal includes a first clock signal and a second clock signal.

12. A radio signal receiving circuit according to claim 6, wherein the pulse generator outputs the pulse signal at a timing after a predetermined time has passed from receiving the synchronizing pattern signal.

13. A radio signal receiving circuit according to claim 12, wherein the predetermined time is about 5 microseconds.

14. A radio signal receiving circuit for measuring a bit error rate characteristic, comprising:
   a demodulator circuit receiving a radio signal that includes a burst signal, the demodulator circuit generating demodulated data by demodulating the burst signal;
   a detector connected to the demodulator circuit, the detector outputting a synchronizing pattern signal detected from the demodulated data;
   a pulse generator connected to the detector, the pulse generator generating a pulse signal in response to the synchronizing pattern signal;
   a control circuit connected to the detector and the pulse generator, the control circuit outputting a control signal in response to the synchronizing pattern signal and the pulse signal;
   a clock generator connected to the control circuit, the clock generator generating a clock signal in response to the control signal; and
   a storing circuit connected to the demodulator and the clock generator, the storing circuit storing and outputting a pseudo random pattern included in the demodulated data in response to the clock signal.

15. A radio signal receiving circuit according to claim 14, wherein the burst signal includes a preamble, a unique word, an error detection bit and data.

16. A radio signal receiving circuit according to claim 15, wherein the unique word corresponds to the synchronizing pattern signal.

17. A radio signal receiving circuit according to claim 14, wherein the pulse generator includes a counter.

18. A radio signal receiving circuit according to claim 14, wherein the pulse generator generates the pulse signal when either one of the synchronizing pattern signal or the pulse signal is activated.

19. A radio signal receiving circuit according to claim 14, wherein the pulse generator outputting the pulse signal at a timing after a predetermined time has passed from receiving the synchronizing pattern signal.

20. A radio signal receiving circuit according to claim 19, wherein the predetermined time is about 5 microseconds.

* * * * *